US012544831B2

(12) United States Patent
Taguchi et al.

(10) Patent No.: US 12,544,831 B2
(45) Date of Patent: Feb. 10, 2026

(54) DUST CORE

(71) Applicant: KABUSHIKI KAISHA TOYOTA JIDOSHOKKI, Kariya (JP)

(72) Inventors: Rie Taguchi, Nagakute (JP); Kunio Akedo, Nagakute (JP); Takanori Murasaki, Kariya (JP); Takahiro Okazaki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 932 days.

(21) Appl. No.: 17/775,744

(22) PCT Filed: Oct. 21, 2020

(86) PCT No.: PCT/JP2020/039567
§ 371 (c)(1),
(2) Date: May 10, 2022

(87) PCT Pub. No.: WO2021/095467
PCT Pub. Date: May 20, 2021

(65) Prior Publication Data

US 2022/0392677 A1 Dec. 8, 2022

(30) Foreign Application Priority Data

Nov. 13, 2019 (JP) ................................ 2019-205542

(51) Int. Cl.

| | |
|---|---|
| ***H01F 27/24*** | (2006.01) |
| ***B22F 1/00*** | (2022.01) |
| ***B22F 1/054*** | (2022.01) |
| ***B22F 3/00*** | (2021.01) |
| ***H01F 1/20*** | (2006.01) |
| ***H01F 1/26*** | (2006.01) |
| ***H01F 3/08*** | (2006.01) |
| ***H01F 27/255*** | (2006.01) |

(52) U.S. Cl.
CPC .................. *B22F 3/00* (2013.01); *B22F 1/00* (2013.01); *B22F 1/054* (2022.01); *H01F 1/20* (2013.01); *H01F 27/255* (2013.01)

(58) Field of Classification Search
CPC ... H01F 3/08; H01F 3/00; H01F 27/24; H01F 27/255; H01F 1/20; H01F 1/26; H01F 1/34; H01F 1/342; H01F 1/36; H01F 1/37; H01F 41/125; B22F 1/05; B22F 1/054
See application file for complete search history.

(56) References Cited

U.S. PATENT DOCUMENTS 5,951,937 A 9/1999 Taguchi et al.
2005/0003199 A1* 1/2005 Takaya ............... C08G 59/4223 428/416
2014/0138569 A1 5/2014 Otsuka et al.
2015/0104664 A1* 4/2015 Ikari ...................... H01Q 1/364 335/297
2018/0218814 A1 8/2018 Yoshida et al.

FOREIGN PATENT DOCUMENTS

| | | | |
|---|---|---|---|
| CN | 103846426 | A | 6/2014 |
| DE | 697 34 193 | T2 | 11/2006 |
| JP | 2000-223308 | A | 8/2000 |
| JP | 2005-129716 | A | 5/2005 |
| JP | 2007-211341 | A | 8/2007 |
| JP | 2016-012688 | A | 1/2016 |
| JP | 2016-222844 | A | 12/2016 |
| JP | 2018-9200 | A | 1/2018 |

OTHER PUBLICATIONS

International Search Report for PCT/JP2020/039567 dated Jan. 12, 2021 [PCT/ISA/210].

* cited by examiner

*Primary Examiner* — Matthew E. Hoban
*Assistant Examiner* — Lynne Edmondson
(74) *Attorney, Agent, or Firm* — Sughrue Mion, PLLC

(57) ABSTRACT

A dust core contains magnetic nanoparticles whose average particle size is 1 to 300 nm, and an aromatic compound that includes two or more functional groups of at least one type selected from a group consisting of a carboxy group and a hydroxy group.

8 Claims, 1 Drawing Sheet

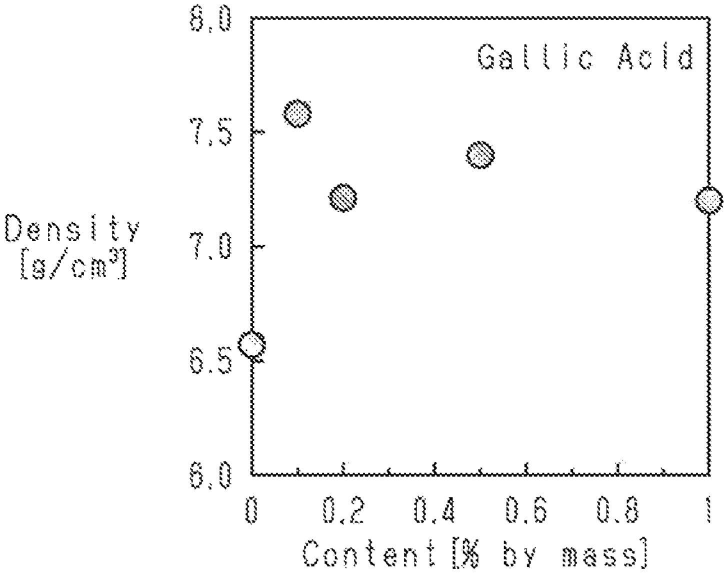
Gallic Acid
Density [g/cm³]
8.0
7.5
7.0
6.5
6.0
0
0.2
0.4
0.6
0.8
1
Content [% by mass]

DUST CORE

CROSS REFERENCE TO RELATED APPLICATIONS

This application is a National Stage of International Application No. PCT/JP2020/039567 filed Oct. 21, 2020, claiming priority based on Japanese Patent Application No. 2019-205542 filed Nov. 13, 2019.

TECHNICAL FIELD

The present invention relates to a dust core, and more particularly, to a dust core made of magnetic nanoparticles.

BACKGROUND ART

A dust core is obtained by compression-molding magnetic particles whose surface is coated with an insulating film. Dust cores are used in wide variety of products that utilize electromagnetism, such as transformers, electric motors, generators, speakers, induction heaters, and various types of actuators. Such dust cores are disclosed in the documents listed below. Patent Literature 1 discloses a core that is obtained by coating the surface of powder of soft magnetic material (particle size: 5 to 200 μm) with a silicone resin, coating the powder with a higher fatty acid lubricant made of stearic acid or its metal salt to make soft magnetic powder, pressing the soft magnetic powder, and heat-treating the pressed powder. Patent Literature 2 discloses a dust core that includes composite magnetic particles. The composite magnetic particles include metal magnetic particles, an insulating film that contains at least one of metal phosphate or metallic oxide covering the surface of the metal magnetic particles, and a lubricant film that covers the surface of the insulating film and contains metallic soap made of metal salt such as stearic acid. Patent Literature 3 discloses a dust core that is formed by compression-molding and heat-treating a soft magnetic material. The soft magnetic material includes iron-based powder (average particle size: 30 to 500 μm) having an insulating film made of phosphate on the surface, and a lubricant that contains ester of a fatty acid having a hydroxy group. Patent Literature 4 discloses a dust core that includes coated iron powder (average particle size: 200 to 450 μm) including an insulating film, and a lubricant made of fatty acid amide.

Because of significantly small size, magnetic nanoparticles have properties different from those of bulk magnetic materials. For example, for particles having a size exceeding approximately 100 nm, the coercive force increases as the particle size decreases and is maximized when the particle size is closer to 100 nm. However, if the particle size is less than or equal to approximately 20 nm, superparamagnetic phenomena occur, which significantly reduces the coercive force. Thus, a dust core made of magnetic nanoparticles whose particle size is less than or equal to approximately 20 nm is thought to reduce hysteresis loss significantly. Also, in a case of a dust core made of insulating magnetic nanoparticles or conductive magnetic nanoparticles having an insulating film on the surface, the use of magnetic nanoparticles whose particle size is less than or equal to approximately 300 nm is thought to limit paths of eddy currents at high frequencies, so that eddy-current loss is reduced. Particularly, the use of magnetic nanoparticles whose particle size is less than or equal to approximately 20 nm is though to reduce eddy-current loss significantly. Dust cores made of magnetic nanoparticles whose particle size is less than or equal to approximately 20 nm reduce hysteresis loss and eddy-current loss significantly, and are thus expected to serve as components for transformer cores used in power sources.

CITATION LIST

Patent Literature

Patent Literature 1: Japanese Laid-Open Patent Publication No. 2000-223308
Patent Literature 2: Japanese Laid-Open Patent Publication No. 2005-129716
Patent Literature 3: Japanese Laid-Open Patent Publication No. 2007-211341
Patent Literature 4: Japanese Laid-Open Patent Publication No. 2016-12688

SUMMARY OF INVENTION

Technical Problem

However, when magnetic nanoparticles are mixed with a conventional lubricant such as stearic acid or its metal salt, fatty acid ester, or fatty acid amide, and the mixture is compression-molded under a conventional molding condition (for example, molding temperature: 150° C., molding pressure: 1.4 GPa) to obtain a dust core, the density of the dust core will not necessarily be sufficiently high. This is thought to be because, when the size of magnetic particles is as small as nanometers, the plastic deformation strength of the magnetic particles is so increased that the magnetic nanoparticles are not plastically deformed to a sufficient degree under the conventional molding condition. In order to plastically deform magnetic nanoparticles to a sufficient degree, the molding temperature may be increased. However, an increase in the molding temperature reduces the strength of the mold.

The present inventors focused on the fact that the melting point of metal nanoparticles is lower than the melting point of a bulk metal, and predicted that the temperature at which the plastic deformation strength of the metal nanoparticles decreases would also be lower than the temperature at which the plastic deformation strength of the bulk metal decreases. Accordingly, the present inventors predicted that there would be a temperature range in which, even if the temperature was higher than the conventional molding temperature, the plastic deformation strength of magnetic nanoparticles would decrease and the strength of the mold would not be reduced. They further predicted that heating magnetic nanoparticles in this temperature range would allow the magnetic nanoparticles to be plastically deformed to a sufficient degree, so that a dust core of a high density would be obtained.

However, if a conventional lubricant and magnetic nanoparticles are mixed, and the mixture is compression-molded at a temperature higher than the conventional molding temperature, the lubricant volatilizes, decomposes, or deteriorates. This decreases the binder effect of the lubricant. Also, high temperature molding will increase thermal deformation, resulting in large cracks in or damages to the obtained dust core.

It is an objective of the present invention to provide a dust core that is molded at a temperature higher than or equal to 300° C., has a high density, and suppresses the occurrence of cracks.

Solution to Problem

Through their extensive research, the present inventors have discovered that it is possible to obtain a dust core that has a high density and suppressed occurrence of cracks even if the dust core is molded at temperature higher than or equal to 300° C. by adding an aromatic compound that includes two or more functional groups of at least one type selected from a group consisting of a carboxy group and a hydroxy group to magnetic nanoparticles, and compression-molding the mixture. The inventors thus completed the present invention.

That is, a dust core according to the present invention contains magnetic nanoparticles whose average particle size is 1 to 300 nm, and an aromatic compound that includes two or more functional groups of at least one type selected from a group consisting of a carboxy group and a hydroxy group.

In the dust core according to the present invention, the aromatic compound is preferably at least one type selected from a group consisting of: (i) an aromatic compound in which two or more functional groups that are bounded to the same aromatic ring are one or more carboxy groups and one or more hydroxy groups, and the positional relationships of the carboxy groups and the hydroxy groups are all meta positions and/or para positions; (ii) an aromatic compound in which two or more functional groups that are bounded to the same aromatic ring are all carboxy groups, and the positional relationships of the two carboxy groups are all meta positions or para positions; and (iii) an aromatic compound in which two or more functional groups that are bounded to the same aromatic ring are all hydroxy groups, and the positional relationships of the two hydroxy groups are all meta positions or para positions. Also, the aromatic compound is preferably at least one type selected from a group consisting of 4-hydroxybenzoic acid, 3-hydroxybenzoic acid, 3,5-dihydroxybenzoic acid, 3,4-dihydroxybenzoic acid, 3,4,5-trihydroxybenzoic acid, 5-hydroxyisophthalic acid, 4-hydroxyphthalic acid, 1,4-benzenedicarboxylic acid, 1,3-benzenedicarboxylic acid, 1,3,5-benzenetricarboxylic acid, 1,4-benzenediol, 1,3-benzenediol, and 1,3,5-benzenetriol.

Further, in the dust core according to the present invention, the aromatic compound is preferably a monocyclic aromatic compound. Also a content of the aromatic compound is preferably 0.01 to 5% by mass in relation to a total amount of the magnetic nanoparticles and the aromatic compound.

It is not exactly clear why a dust core that contains the above-described magnetic nanoparticles, has a high density, and suppresses the occurrence of cracks is obtained by adding the above-described aromatic compound to the magnetic nanoparticles. However, the present inventors conjecture that the following is the case. An aromatic compound that includes two or more functional groups of at least one type selected from a group consisting of a carboxy group and a hydroxy group has a high melting point and thus resists volatilization, decomposition, or deterioration at high temperatures. Since the above-described aromatic compound has two or more functional groups (a carboxy group and/or a hydroxy group) that have a high bond strength with magnetic nanoparticles, the bond strength between the magnetic nanoparticles is increased. Further, since the above-described aromatic compound achieves a high bond strength between aromatic compounds due to the planarity of aromatic rings, it is conjectured that, even if the dust core is molded at a temperature higher than or equal to 300° C., the dust core has a high density and suppresses the occurrence of cracks.

Advantageous Effects of Invention

The present invention provides a dust core that has a high density and suppresses the occurrence of cracks even if the dust core is molded at a temperature higher than or equal to 300° C.

BRIEF DESCRIPTION OF DRAWING

FIG. 1 is a graph showing a relationship between a 3,4,5-trihydroxybenzoic acid (gallic acid) content and the density of a dust core.

DESCRIPTION OF EMBODIMENTS

An embodiment of the present invention will be described in detail below.

A dust core according to the present invention contains magnetic nanoparticles whose average particle size is 1 to 300 nm, and an aromatic compound that includes two or more functional groups of at least one type selected from a group consisting of a carboxy group and a hydroxy group.

The magnetic nanoparticles used in the present invention are not particularly limited as long as the magnetic nanoparticles can be used for a dust core, and include, for example, Fe nanoparticles, Fe-containing alloy nanoparticles, and Fe-containing metallic oxide nanoparticles. Also, Fe nanoparticles and Fe-containing alloy nanoparticles may have an insulating layer on the surface. A selected type of magnetic nanoparticles may be used alone. Alternatively, two or more types of magnetic nanoparticles may be used together. Among these, Fe nanoparticles that have an insulating layer on the surface and Fe-containing alloy nanoparticles that have an insulating layer on the surface are preferred, since these nanoparticles reduce hysteresis loss and eddy-current loss, have relatively high saturation flux densities, and have relatively low degrees of property degradation at high temperatures.

Fe-containing alloy nanoparticles are not particularly limited as long as they can be used for the dust core, and include, for example, FeNi alloy nanoparticles (such as permalloy B nanoparticles), FeSi alloy nanoparticles (such as silicon steel nanoparticles), FeCo alloy nanoparticles (such as permendur nanoparticles), and NiFe alloy nanoparticles (such as permalloy C nanoparticles). Also, Fe-containing metallic oxide nanoparticles are not particularly limited as long as they can be used for the dust core, and include, for example, ferrite nanoparticles such as NiZn ferrite nanoparticles, and MnZn ferrite nanoparticles.

The insulating layer may be: an insulating layer made of metal oxide such as $SiO_2$, $Al_2O_3$, $Fe_2O_3$, $Fe_3O_4$, NiZn ferrite, and MnZn ferrite; an insulating layer made of an organic compound such as fatty acid (for example, decanoic acid, lauric acid, stearic acid, oleic acid, linolenic acid) and a silicone-based organic compound (for example, methyl silicone resin, methylphenyl silicone resin, dimethylpolysiloxane, silicone hydrogel); or an insulating layer made of an inorganic compound such as a phosphorus compound (for example, calcium phosphate, iron phosphate, zinc phosphate, and manganese phosphate).

The average particle size of the magnetic nanoparticles used in the present invention is 1 to 300 nm. If the average particle size of the magnetic nanoparticles is less than the lower limit, the magnetic property of the magnetic nanoparticles is reduced due to increased influence of the particle surfaces. In contrast, if the average particle size of the magnetic nanoparticles exceeds the upper limit, the eddy-current loss is increased, so that the core loss is increased. The average particle size of the magnetic nanoparticles is preferably 1 to 100 nm, and more preferably 1 to 20 nm, in order to cause superparamagnetic phenomena to occur so that the coercive force is significantly reduced, allow the hysteresis loss to be reduced significantly, limit paths of eddy currents at high frequencies, and reduce the eddy-current loss significantly. The average particle size of the magnetic nanoparticles is obtained by measuring the sizes of hundred particles through observation using a transmission electron microscope (TEM) and calculating the average value of the measured sizes.

The aromatic compound used in the present invention includes two or more functional groups of at least one type selected from a group consisting of a carboxy group and a hydroxy group. A dust core that has a high density and suppresses the occurrence of cracks even if the dust core is molded at a temperature higher than or equal to 300° C. is obtained by adding the aromatic compound to the magnetic nanoparticles.

The aromatic compound is not particularly limited, but is preferably any of the followings:

(i) an aromatic compound in which two or more functional groups that are bounded to the same aromatic ring are one or more carboxy groups and one or more hydroxy groups, and the positional relationships of the carboxy groups and the hydroxy groups are all meta positions and/or para positions;

(ii) an aromatic compound in which two or more functional groups that are bounded to the same aromatic ring are all carboxy groups, and the positional relationships of the two carboxy groups are all meta positions or para positions; and (iii) an aromatic compound in which two or more functional groups that are bounded to the same aromatic ring are all hydroxy groups, and the positional relationships of the two hydroxy groups are all meta positions or para positions.

An aromatic compound in which the positional relationships of functional groups are meta positions and/or para positions is unlikely to become an anhydride through dehydration or dealcoholization even at high temperatures, and is therefore stable at high temperatures. Accordingly, a dust core is obtained that has a high density and suppresses the occurrence of cracks even if the dust core is molded at a temperature higher than or equal to 300° C. In contrast, an aromatic compound in which the positional relationships of functional groups are ortho positions become an anhydride through dehydration or dealcoholization at high temperatures and thus cannot generate a high bond strength with magnetic nanoparticles. This type of aromatic compound thus cannot form a stable coating layer. This type of aromatic compound is therefore unlikely to provide a dust core that has a high density and suppresses the occurrence of cracks.

This type of aromatic compound includes the ones listed below. Aromatic compound (i), which includes 4-hydroxybenzoic acid [Formula (i-1) shown below], 3-hydroxybenzoic acid [Formula (i-2) shown below], 3,5-dihydroxybenzoic acid [Formula (i-3) shown below], 3,4-dihydroxybenzoic acid [Formula (i-4) shown below], 3,4,5-trihydroxybenzoic acid [Formula (i-5) shown below], 5-hydroxyisophthalic acid[Formula (i-6) shown below], 4-hydroxyphthalic acid [Formula (i-7) shown below], 4,5-dihydroxyphthalic acid [Formula (i-8) shown below], and 5-hydroxybenzene-1,2,3-tricarboxylic acid [Formula (i-9) shown below].

(i-1)

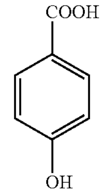

(i-2)

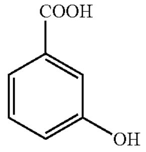

(i-3)

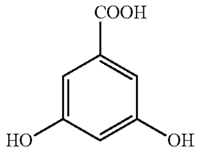

(i-4)

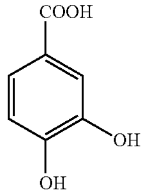

(i-5)

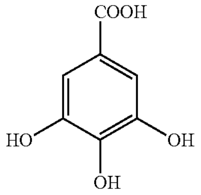

(i-6)

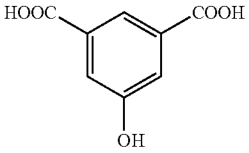

(i-7)

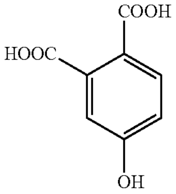

(i-8)

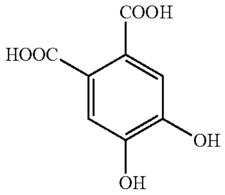

-continued (i-9)

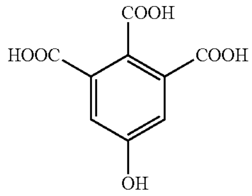

Aromatic compound (ii), which includes 1,4-benzenedicarboxylic acid [Formula (ii-1) shown below], 1,3-benzenedicarboxylic acid [Formula (ii-2) shown below], and 1,3,5-benzenetricarboxylic acid [Formula (ii-3) shown below].

(ii-1)

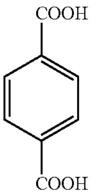

(ii-2)

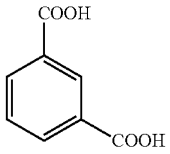

(ii-3)

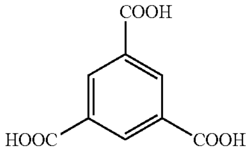

Aromatic compound (iii), which includes 1,4-benzenediol [Formula (iii-1) shown below], 1,3-benzenediol [Formula (iii-2) shown below], and 1,3,5-benzenetriol [Formula (iii-3) shown below].

(iii-1)

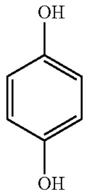

(iii-2)

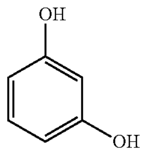

-continued (iii-3)

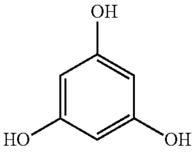

Only one type of these aromatic compounds may be used independently. Alternatively, two or more types may be used together. In order to obtain a dust core that has a high density and suppresses the occurrence of cracks even if the dust core is molded at a temperature higher than or equal to 300° C., it is preferable to select, among these types of aromatic compound, aromatic compound (i) (more preferably, 4-hydroxybenzoic acid, 3-hydroxybenzoic acid, 3,5-dihydroxybenzoic acid, 3,4-dihydroxybenzoic acid, 3,4,5-trihydroxybenzoic acid, 5-hydroxyisophthalic acid, or 4-hydroxyphthalic acid; further preferably, 4-hydroxybenzoic acid, 3,4,5-trihydroxybenzoic acid) and aromatic compound (ii) (more preferably, 1,4-benzenedicarboxylic acid, 1,3-benzenedicarboxylic acid, 1,3,5-benzenetricarboxylic acid; further preferably, 1,3,5-benzenetricarboxylic acid). It is more preferable to select aromatic compound (i) (further preferably, 4-hydroxybenzoic acid, 3,4,5-trihydroxybenzoic acid, particularly preferably 4-hydroxybenzoic acid).

The aromatic compound used in the present invention may be a monocyclic aromatic compound or a polycyclic aromatic compound such as a condensed ring. A polycyclic aromatic compound has weak coordination properties for particles due to steric hindrance, whereas a monocyclic aromatic compound has strong coordination properties for particles. Accordingly, a monocyclic aromatic compound is preferable.

The melting point of the aromatic compound is preferably 200° C. or higher, and more preferably 250° C. or higher. If the melting point of the aromatic compound is lower than the lower limit, the aromatic compound melts when molded at a temperature higher than or equal to 300° C., so that a high bond strength is not generated between the aromatic compound and magnetic nanoparticles. It is thus difficult to form a stable coating layer. This type of aromatic compound is therefore unlikely to provide a dust core that has a high density and suppresses the occurrence of cracks. The upper limit of the melting point of the aromatic compound is not particularly limited, but preferably lower than or equal to 500° C. in order that the aromatic compound be removed easily in an annealing process after molding.

The content of the aromatic compound is not particularly limited. In relation to the total amount of the magnetic nanoparticles and the aromatic compound, the content of the aromatic compound is preferably 0.01 to 5% by mass, more preferably 0.1 to 2% by mass, and particularly preferably 0.1 to 1% by mass. If the content of the aromatic compound is less than the lower limit, the aromatic compound will not be sufficiently distributed to spaces between the magnetic nanoparticles, so the flowability of the magnetic nanoparticles is lower in those spaces. The density of the dust core is thus unlikely to be increased. If the content of the aromatic compound exceeds the upper limit, the proportion of non-magnetic components increases. This is likely to reduce the magnetic property of the dust core.

The dust core of the present invention has a density of 7.0 $g/cm^3$ or higher, and thus has a high relative magnetic permeability. Also, in order to increase the relative magnetic permeability, the density of the dust core is preferably 7.1 $g/cm^3$ or higher, and more preferably 7.3 $g/cm^3$ or higher.

The dust core of the present invention can be produced, for example, by the following method. First, the magnetic nanoparticles and the aromatic compound are mixed to achieve predetermined contents. The mixture of the magnetic nanoparticles and the aromatic compound has a high homogeneity. This ensures sufficient flowability of magnetic nanoparticles in the compression molding, which will be discussed below, so that a dust core having a high density is obtained.

The method for mixing the magnetic nanoparticles and the aromatic compound is not particularly limited, and includes a method that performs mixing by a ball mill or a mortar, and a method that disperses and dissolves the magnetic nanoparticles and the aromatic compound in a solvent and then removes the solvent, for example, through drying. Since the magnetic nanoparticles are relatively difficult to rearrange, spray drying may be performed after dispersing and dissolving the magnetic nanoparticles and the aromatic compound in the solvent to prepare granulated mixture. In this case, the compression molding causes the granulated mixture to crumble, so that the magnetic nanoparticles are easily rearranged, increasing the density of the dust core.

Next, a mold with lubricant applied thereto is filled with the mixture of the magnetic nanoparticles and the aromatic compound, which has been obtained in the above described manner. The lubricant is not particularly limited, and may be, for example, a metal salt of saturated fatty acid such as lithium stearate and zinc stearate, or lubricating grease (for example, M-HGSSC-H500 produced by MISUMI Corporation).

Then, the mixture of the magnetic nanoparticles and the aromatic compound, which fills the mold, is compression-molded to obtain the dust core of the present invention. The molding temperature is preferably 300 to 600° C., and more preferably 300 to 400° C. If the molding temperature is lower than the lower limit, the plastic deformation strength of the magnetic nanoparticles is not sufficiently reduced, and the density of the obtained dust core is unlikely to be easily increased. If the molding temperature exceeds the upper limit, the strength of the mold decreases and the life of the mold is likely to be shortened. The mold may be heated to a target temperature (molding temperature) either before or after being filled with the mixture of the magnetic nanoparticles and the aromatic compound.

The molding pressure is preferably 500 MPa to 3 GPa, and more preferably 800 MPa to 2 GPa. If the molding pressure is lower than the lower limit, the mixture is not sufficiently compressed, so that the density of the dust core is likely to be low. If the molding pressure exceeds the upper limit, the influence of springback phenomenon is increased. This is likely to cause cracks. Accordingly, the density of the dust core is likely to be low.

The dust core, which is produced in the above-described manner, may be heat-treated as necessary. This reduces the strain in the dust core caused by compression, thereby improving the magnetic properties. The temperature of such a heat treatment is normally 500 to 800° C.

EXAMPLES

Hereinafter, the present invention will be described based on examples and comparative examples. However, the present invention is not limited to the examples below.

Example 1

Magnetic nanoparticles, or 4.975 g (99.5% by mass) of FeNi alloy nanoparticles whose average particle size was 100 nm (produced by Sigma-Aldrich Co. LLC), and an aromatic compound, or 0.025 g (0.5% by mass) of gallic acid (3,4,5-trihydroxybenzoic acid produced by FUJIFILM Wako Pure Chemical Corporation), were mixed, and the mixture was further crushed and mixed by a mortar for 30 minutes. The crushed mixture was placed in a mold for pellet testing piece, to which a grease (M-HGSSC-H500 produced by MISUMI Corporation) had been applied. The mixture was heated at 350° C. for one minute, while being compressed to 1.4 GPa by using a manual hydraulic vacuum heating press (Modified IMC-1946 produced by Imoto Machinery Co., Ltd.). After compression is finished, the press was cooled to room temperature, and the obtained magnetic nanoparticle compact (dust core pellet (outer diameter 3 mmφ)) was removed from the mold. The density was calculated from the mass and the volume of the obtained compact. The results are shown in FIG. 1 and Table 1.

Example 2

A magnetic nanoparticle compact (dust core pellet (outer diameter 3 mmφ)) was made in the same manner as in Example 1, except that the quantity of FeNi alloy nanoparticles was changed to 4.995 g (99.9% by mass) and the quantity of gallic acid was changed to 0.005 g (0.1% by mass), and the density of the compact was calculated. The results are shown in FIG. 1.

Example 3

A magnetic nanoparticle compact (dust core pellet (outer diameter 3 mmφ)) was made in the same manner as in Example 1, except that the quantity of FeNi alloy nanoparticles was changed to 4.990 g (99.8% by mass) and the quantity of gallic acid was changed to 0.010 g (0.2% by mass), and the density of the compact was calculated. The results are shown in FIG. 1.

Example 4

A magnetic nanoparticle compact (dust core pellet (outer diameter 3 mmφ)) was made in the same manner as in Example 1, except that the quantity of FeNi alloy nanoparticles was changed to 4.950 g (99.0% by mass) and the quantity of gallic acid was changed to 0.050 g (1.0% by mass), and the density of the compact was calculated. The results are shown in FIG. 1.

Example 5

A magnetic nanoparticle compact (dust core pellet (outer diameter 3 mmφ)) was made in the same manner as in Example 1, except that 0.025 g (0.5% by mass) of trimesic acid (1,3,5-benzenetricarboxylic acid produced by FUJIFILM Wako Pure Chemical Corporation) was used as the aromatic compound, and the density of the compact was calculated. The results are shown in Table 1.

Example 6

A magnetic nanoparticle compact (dust core pellet (outer diameter 3 mmφ)) was made in the same manner as in Example 1, except that 0.025 g (0.5% by mass) of p-hydroxybenzoic acid (4-hydroxybenzoic acid produced by FUJIFILM Wako Pure Chemical Corporation) was used as the aromatic compound, and the density of the compact was calculated. The results are shown in Table 1.

Example 7

A magnetic nanoparticle compact (dust core pellet (outer diameter 3 mmφ)) was made in the same manner as in Example 1, except that 0.025 g (0.5% by mass) of hydroquinone (1.4-benzenediol produced by FUJIFILM Wako Pure Chemical Corporation) was used as the aromatic compound, and the density of the compact was calculated. The results are shown in Table 1.

Comparative Example 1

A magnetic nanoparticle compact (dust core pellet (outer diameter 3 mmφ)) was made in the same manner as in Example 1, except that no aromatic compound was mixed in, and the density of the compact was calculated. The results are shown in Table 1 and FIG. 1.

Comparative Example 4

A magnetic nanoparticle compact (dust core pellet (outer diameter 3 mmφ)) was made in the same manner as in Example 1 except that 0.025 g (0.5% by mass) of benzoic acid (produced by FUJIFILM Wako Pure Chemical Corporation) was used in place of gallic acid, and the density of the compact was calculated. The results are shown in Table 1.

<Crack Rate>

The dust core pellets obtained in Examples 1 and 5 to 7 and the Comparative Examples 1 to 4 were cut at a plane parallel with the longitudinal direction of the pellet and ground. The cross section of each dust core pellet was observed through a scanning electron microscope. The length of a crack was measured in an image at 50-fold magnification, and the length of the crack was divided by the area of the observed cross section of the dust core. The resultant was calculated as a crack rate (unit: $mm/mm^2$). The measurement was performed at four locations in each pellet, and the average value was calculated. The results are shown in Table 1.

TABLE 1

| | Aromatic Compound | | | | | |
|---|---|---|---|---|---|---|
| | Type | Hydrocarbon | Carboxy Group | Hydodxy Group | Density [$g/cm^3$] | Crackc Rate [$mm/mm^2$] |
| Example 1 | Gallic Acid | Aromatic | 1 | 3 | 7.41 | 0.07 |
| Example 5 | Trimesic Acid | Aromatic | 3 | 0 | 7.18 | 0.30 |
| Example 6 | p-Hydroxybenzoic Acid | Aromatic | 1 | 1 | 7.51 | 0 |
| Example 7 | Hydroquinone | Aromatic | 0 | 2 | 7.09 | 0.25 |
| Comparative Example 1 | None | — | — | — | 6.58 | 2.38 |
| Comparative Example 2 | Lignoceric Acid | Saturated Aliphatic | 1 | 0 | 6.94 | 0.84 |
| Comparative Example 3 | Phenol | Aromatic | 0 | 1 | 6.85 | 0.79 |
| Comparative Example 4 | Benzoic Acid | Aromatic | 1 | 0 | 7.24 | 1.01 |

Comparative Example 2

A magnetic nanoparticle compact (dust core pellet (outer diameter 3 mmφ)) was made in the same manner as in Example 1 except that 0.025 g (0.5% by mass) of lignoceric acid (produced by Tokyo Chemical Industry Co., Ltd.), which was saturated aliphatic carboxylic acid, was used in place of gallic acid, and the density of the compact was calculated. The results are shown in Table 1.

Comparative Example 3

A magnetic nanoparticle compact (dust core pellet (outer diameter 3 mmφ)) was made in the same manner as in Example 1 except that 0.025 g (0.5% by mass) of phenol (produced by FUJIFILM Wako Pure Chemical Corporation) was used in place of gallic acid, and the density of the compact was calculated. The results are shown in Table 1.

FIG. 1 shows that, as compared to the dust core in which no aromatic compound was mixed (Comparative Example 1), the density was high (7.0 $g/cm^3$ or higher) in each of the dust cores in which the magnetic nanoparticles and the aromatic compound that included two or more functional groups of at least one type selected from a group consisting of a carboxy group and a hydroxy group (Examples 1 to 4), even in a case in which the dust core was molded at a temperature higher than or equal to 300° C. Also, Table 1 shows that the crack rate was low (0.50 $mm/mm^2$ or less) in the dust cores in which the aromatic compound was mixed (Examples 1 to 4), even in a case in which the dust core was molded at a temperature higher than or equal to 300° C., as compared to the dust core in which no aromatic compound was mixed (Comparative Example 1).

Table 1 also shows that the density was high and the crack rate was low in the dust core in which the magnetic nanoparticles and saturated aliphatic carboxylic acid were mixed (Comparative Example 2) and in the dust core in which the magnetic nanoparticles and aromatic monoalcohol were mixed (Comparative Example 3), even in a case in which the dust core was molded at a temperature higher than or equal to 300° C., as compared to the dust core in which no aromatic compound was mixed (Comparative Example 1). However, the density was low (less than 7.0 $g/cm^3$) and the crack rate was high (over 0.50 $mm/mm^2$) in the dust cores of Comparative Examples 2 and 3 as compared to the dust cores in which an aromatic compound was mixed (Examples 1, 5, and 6). Also, even in the case in which the dust core in which the magnetic nanoparticles and aromatic monocarboxylic acid were mixed was molded at a temperature higher than or equal to 300° C. (Comparative Example 4), the density was as high (7.0 $g/cm^3$) as that in the case of the dust core in which an aromatic compound was mixed (Examples 1, 5, and 6). However, the crack rate was high (over 0.50 $mm/mm^2$) in the dust core of Comparative Example 4 as compared to the dust cores in which an aromatic compound was mixed (Examples 1, 5, and 6).

The results above demonstrate that, when magnetic nanoparticles are mixed with an aromatic compound that includes two or more functional groups of at least one type selected from a group consisting of a carboxy group and a hydroxy group, a dust core is obtained that has a high density and suppressed occurrence of cracks even if the dust core is molded at temperature higher than or equal to 300° C.

INDUSTRIAL APPLICABILITY

As described above, the present invention provides a dust core that has a high density and suppresses the occurrence of cracks even if the dust core is molded at a temperature higher than or equal to 300° C. Thus, the dust core of the present invention has a high relative magnetic permeability, and reduced hysteresis loss and eddy-current loss. Therefore, the dust cores are useful as cores in products that utilize electromagnetism, such as transformers, electric motors, generators, speakers, induction heaters, and various types of actuators.

The invention claimed is:

1. A dust core, comprising:

magnetic nanoparticles whose average particle size is 1 to 300 nm; and 3, 4, 5-trihydroxybenzoic acid.

2. The dust core according to claim 1, wherein a content of the aromatic compound is 0.01 to 5% by mass in relation to a total amount of the magnetic nanoparticles and the aromatic compound.

3. The dust core according to-claim 1, wherein the dust core has a density of 7.0 $g/cm^3$ or higher.

4. The dust core according to-claim 1, wherein the nanoparticles are selected from the group consisting of Fe nanoparticles, Fe-containing alloy nanoparticles, Fe containing metallic oxide particles, Fe nanoparticles having an insulating layer on the surface and Fe-containing alloy nanoparticles having an insulating layer on the surface.

5. The dust core according to claim 4, wherein the Fe-containing alloy nanoparticles are FeNi alloy nanoparticles, FeSi alloy nanoparticles, FeCo alloy nanoparticles, or NiFe alloy nanoparticles.

6. The dust core according to claim 4, wherein the Fe-containing metallic oxide nanoparticles are NiZn ferrite nanoparticles or MnZn ferrite nanoparticles.

7. The dust core according to claim 4, wherein the insulating layer is made of a metal oxide selected from the group consisting of $SiO_2$, $Al_2O_3$, $Fe_2O_3$, $Fe_3O_4$, NiZn ferrite, and MnZn ferrite, an organic compound selected from the group consisting of decanoic acid, lauric acid, stearic acid, oleic acid, linolenic acid, a silicone-based organic compound selected from the group consisting of methyl silicone resin, methylphenyl silicone resin, dimethylpolysiloxane, and silicone hydrogel), or an inorganic compound selected from the group consisting of calcium phosphate, iron phosphate, zinc phosphate, and manganese phosphate.

8. The dust core according to claim 1, wherein the average particle size of the magnetic nanoparticle is 1 to 100 nm.

* * * * *